United States Patent [19]
Tubeue

[11] 3,890,784
[45] June 24, 1975

[54] THERMOHYDRAULIC ENGINES

[75] Inventor: Jean André Georges Tubeue, Le Chesnay, France

[73] Assignee: Societe Europeenne de Propulsion, Puteaux, France

[22] Filed: Apr. 23, 1974

[21] Appl. No.: 463,381

[30] Foreign Application Priority Data

| Apr. 26, 1973 | France | 73.15990 |
| Apr. 26, 1973 | France | 73.15991 |
| Apr. 26, 1973 | France | 73.15992 |
| Apr. 26, 1973 | France | 73.15993 |
| Apr. 26, 1973 | France | 73.15994 |

[52] U.S. Cl. ............... 60/516; 60/721; 91/4 R
[51] Int. Cl. ............................................. F03c 1/00
[58] Field of Search ........... 60/516, 517, 520, 643, 60/645, 670, 676, 698, 721, 325, 416, 419; 91/4 R

[56] References Cited
UNITED STATES PATENTS

| 3,100,965 | 8/1963 | Blackburn | 91/4 X |
| 3,234,853 | 2/1966 | Aber | 91/4 |
| 3,608,311 | 9/1971 | Roesel, Jr. | 60/516 |
| 3,803,847 | 4/1974 | McAlister | 60/721 |

*Primary Examiner*—Martin P. Schwadron
*Assistant Examiner*—Allen M. Ostrager
*Attorney, Agent, or Firm*—Arthur B. Colvin

[57] ABSTRACT

A thermohydraulic engine comprising a power output member coupled to at least one compartment of variable volume. The compartment is placed in fluid communication with at least one of two or more expansion chambers. A liquid such as water fills the compartment and a fluid path to the at least one expansion chamber and partially fills said one expansion chamber. Means provided in each expansion chamber for introducing a product capable of producing energy by its expansion, whereby when the liquid in said one, partially filled expansion chamber has reached a predetermined level as a result of a liquid flow from the compartment, the product is introduced into the unfilled portion of said one expansion chamber and as a result of its expansion urges liquid back into the compartment to produce relative rotation between the compartment and the power output member. The cycle is repeated in the next expansion chamber and so on. The number of compartments is always less than twice the number of expansion chambers.

13 Claims, 9 Drawing Figures

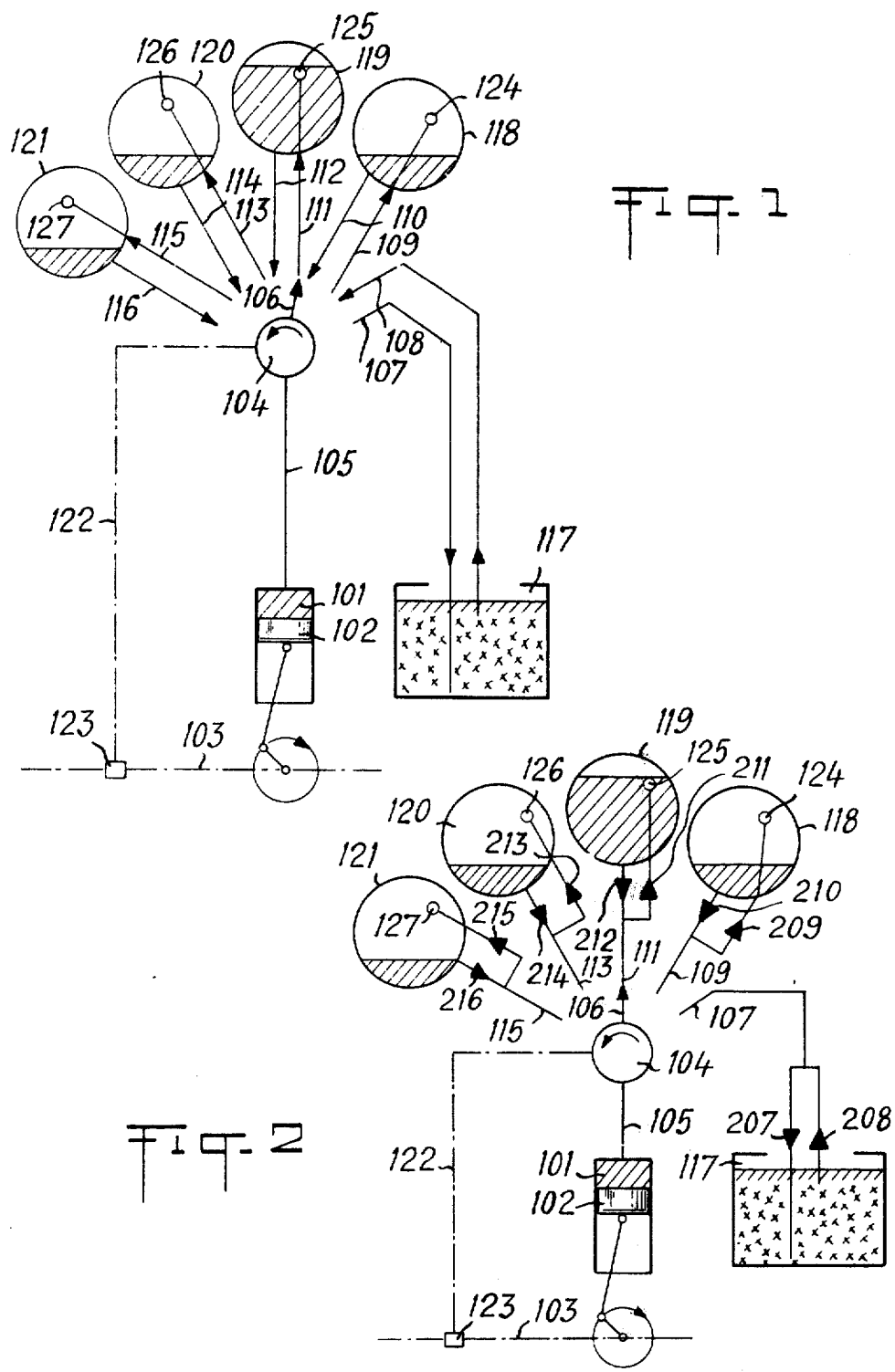

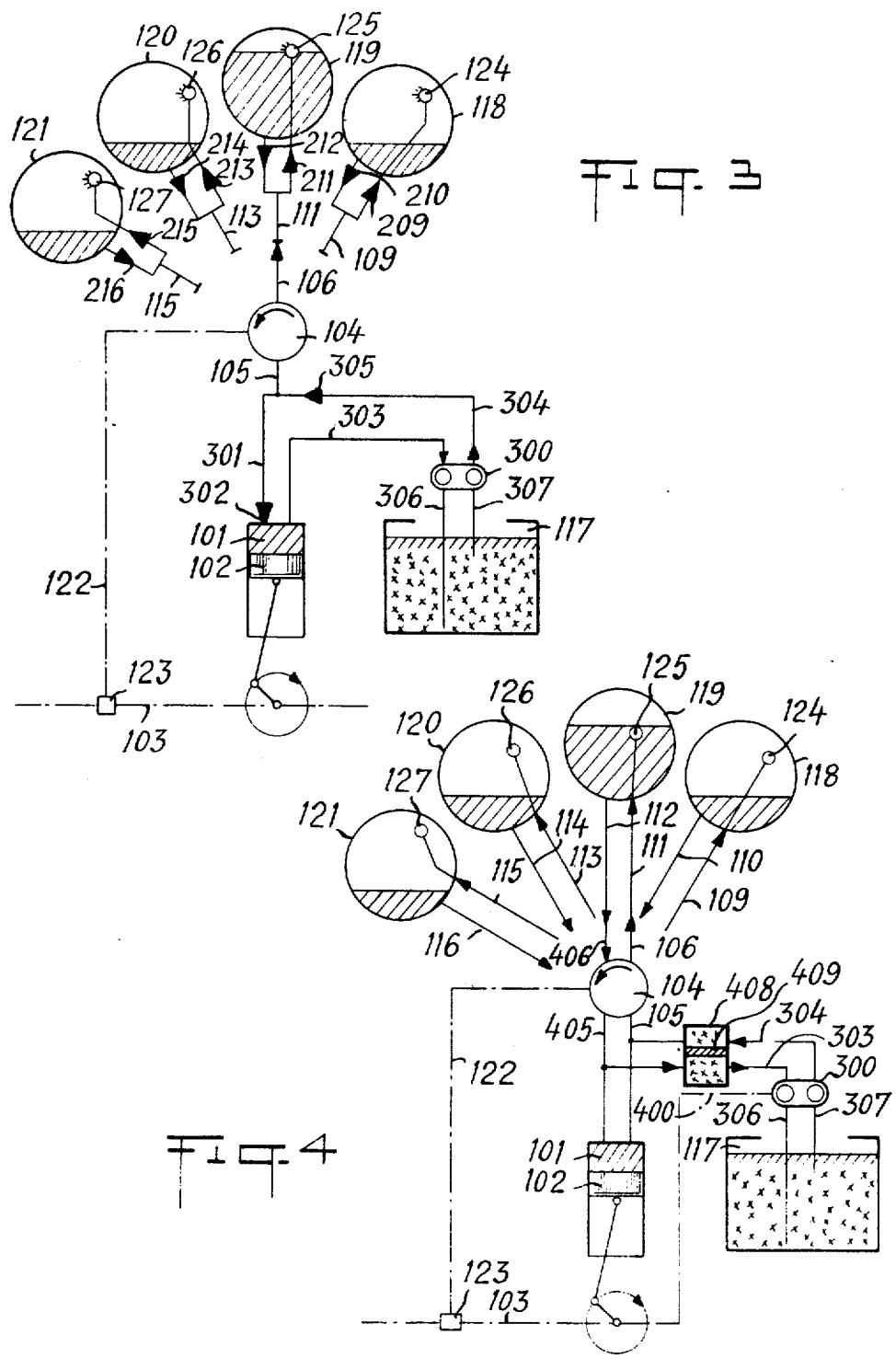

THERMOHYDRAULIC ENGINES

The present invention relates to improvements in or relating to thermohydraulic engines.

Such engines are already known and they comprise an expansion chamber associated with two compartments of variable volume connected to a common drive shaft; a liquid which partly fills the expansion chamber and entirely fills the compartments of variable volume, connecting conduits and intermediary distribution means, transmit the effects of pressure and of variation of volume from one to the others.

Combining several individual engines of this kind leads to a propulsion assembly comprising a plurality of expansion chambers and twice that number of compartments of variable volume. The compartments of variable volume however have a great bulk relative to the expansion chambers which brings with it formidable bulk relative to the power which is available and recovered at the output member.

According to the present invention there is provided a thermohydraulic engine comprising a plurality of expansion chambers in fluid communication with one or more compartments of variable volume coupled to a power output member, the or each of the compartments to be filled, and at least one of the expansion chambers to be partially filled, with a liquid during use of the engine and means for introducing a product capable of producing energy by its expansion into the partially filled expansion chamber when the liquid in that chamber has reached a predetermined level, the number of the compartments being less than twice the number of expansion chambers.

It has been found that the output torque of an engine made in accordance with the present invention is more constant as compared to known thermohydraulic engines.

Additionally, cooling and condensation-dissolution of the combustion products can be ensured under better conditions.

Furthermore the engines made in accordance with the present invention are able to turn faster than conventional engines of thermohydraulic type, are capable of supplying more power for a given bulk. They can supply power either directly by the torque present on their drive shaft or by forcing water to enter a reservoir under pressure.

The present invention will now be described, by way of example, with reference to the accompanying drawings, in which:

FIG. 1 is a schematic view of an engine made in accordance with the present invention in which the replacement of the liquid is obtained in sequential manner;

FIG. 2 is a schematic view of another embodiment of an engine;

FIG. 3 is a schematic view of an engine in which replacement of the liquid is ensured by an exchange device mounted in series;

FIG. 4 is a schematic view of an engine in which replacement of the liquid is ensured by an exchange device mounted in parallel;

Figure 5:
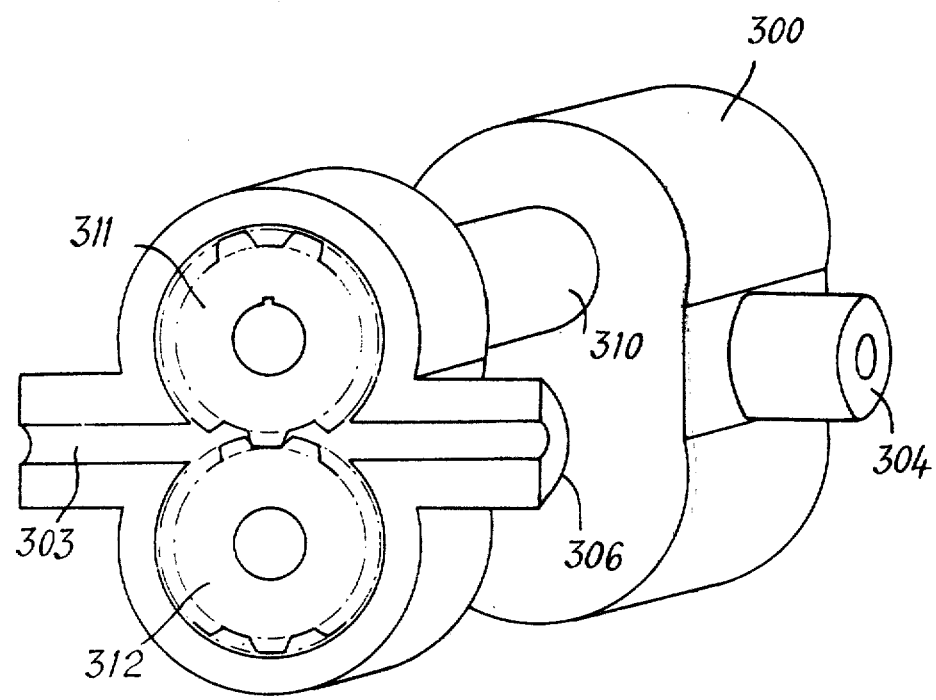
FIG. 5 is a partial sectional view of an exchange device in the form of a double gear pump.

In FIG. 1 there is shown a compartment or cylinder 101 of variable volume formed by a pump body comprising a piston 102 connected by a connecting rod assembly to a shaft 103. This compartment 101 of variable volume, which is full of liquid, is connected by a conduit 105 to a distribution arrangement in the form of a distribution member 104. The engine comprises also four expansion chambers 118, 119, 120 and 121 communicating with the distribution member 104 via conduits 109 to 116 and a liquid reservoir 117 connected to the distribution member 104 by conduits 107 and 108. The expansion chambers 118 to 121 are partly filled with liquid while the conduits, the compartment 101 of variable volume and the distributor 104 are completely filled by this same liquid, generally water. The reservoir 117 of liquid also contains the same liquid. The conduit 107 for returning liquid to the reservoir 117 has its end opening near the bottom of the reservoir whereas the end of the conduit 108 is disposed relatively close to the surface of the liquid in the reservoir 117. By this arrangement any products which the liquid may have picked up in the engine are retained in the reservoir and are not recirculated. The volume of water in the reservoir is frequently sufficient for the products in suspension or in solution to be adequately dispersed therein. In other embodiments the liquid passing through the reservoir 117 is therein subjected to a physicochemical regeneration treatment.

The distribution member 104 may be of any suitable kind having for example mechanically operated valves or a rotary distributing device. The distributor 104 is driven by a shaft 122 connected to the shaft 103 by a power take-off 123 such that the distribution member 104 performs a complete distribution cycle when the shaft 103 performs five revolutions. The change of distribution occurs when the piston is at its upper and lower deadcentre positions (maximum or minimum volume contents) and through the intermediary of a rotating passage 106 or by any other method, communication is successively established between the conduit 105 and each of the 10 conduits 107 to 116; moreover, those of the 10 conduits which are not connected to the line 105 are closed. Thus in the position of the engine shown in FIG. 1 the compartment 101 of variable volume drives the water contained therein into the expansion chamber 119 through the conduits 105, 106 and 111 and all the other expansion chambers are isolated, as is the reservoir 117; the conduit 112 is also shut.

As a result, the expansion chamber 119 progressively fills with water. By means which are not shown, since they are not peculiar to this kind of engine, there are introduced into the space defined in the expansion chamber 119 by the water contained therein combustible gases or a gas under pressure such as steam emanating from a boiler and, as the piston 102 reaches its bottom deadcentre point the thrust of these gases, after their combustion if combustible gases are involved, is applied to the piston through the intermediary of the column of water circulating in the conduits 112, 106 and 105: a driving phase is thus obtained. The water recovered in the compartment 101 of variable volume during this driving phase is sent next into the expansion chamber 120 where it will be at least partly atomised by an atomiser 126, which may be formed of an assembly of nozzles, in such manner that the water is atomised in the expanded gaseous mass, causing rapid cooling of the gaseous mass. Filling of the expansion chambers with liquid may be effected entirely by the nozzles or only partly thereby: in the latter event the distribution member 104 is so arranged that its connection with the conduits is re-established before the piston 102 has completed its upward movement. In this way the cycle of cooling, compression, admission and possibly firing, expansion, and rest, is successively performed in each of the expansion chambers 118 to 121. The total working cycle of an expansion chamber may last for example 0.1 sec. when the shaft 103 turns at 50 revolutions per second.

It is apparent that the water first injected into the expansion chamber 118 is partly atomised by an atomiser 124, passes successively into the chambers 119, 120, 121 where it is heated and picks up combustion products or unburned matter. In one phase of the next working cycle the water is expelled into the reservoir 117 via the conduit 107 and in the next phase regenerated water is taken up by the conduit 108 so as to pursue its path through the engine. The reservoir 117 may be replaced by a natural reservoir of large capacity in which the expelled water disperses sufficiently, such a reservoir may comprise a source of sea water or a water course such as a river.

FIG. 1 shows a pump body, of reduced size, successively connectable to a plurality of expansion chambers. The cubic capacity obtained in this pump body is a fraction of the total cubic capacity of the expansion chambers which is very important since it is known that in thermohydraulic engines the volume represented by the mechanical elements is generally much greater than that occupied by the expansion chambers.

By slightly altering the setting of the distribution member 104 it is possible to obtain an additional advantage, as can be seen from FIG. 2. In FIG. 2 the same elements as in FIG. 1 are identified by the same reference numerals but the distributor 104 has been simplified in that the passage 106 has only five conduits instead of ten to communicate with. Check or non-return valves 207 to 216 have been arranged in such manner as to direct the water circulating toward the appropriate conduit as a function of its sense of circulation. Thus, when the water is driven out of the pump body by the piston 102 in the compartment 101, the water passes successively through the check values 207, 209, 211, 213 and 215.

When the distribution member 104 is set so that it changes position every time the piston 102 passes its lower deadcentre the cycle of the engine is identical to that of FIG. 1. When the distribution member is set at a slight retardation, so that it changes position when the piston 102 has already accomplished part of its ascent, a mist is formed in every chamber which favours the cooling of the chambers during their rest period. In order to obtain this effect it generally suffices to so set the distribution member 104 that the switch from one chamber to the next takes place when the piston has gone through approximately 5% of its ascent.

A number of other means may be employed for improving cooling of the expansion chambers during their rest periods. In a non-illustrated embodiment a pumping element is connected to an auxiliary distributor and water is drawn from the bottom of an expansion chamber and reinjected back into the same chamber through an associated atomiser during a fraction of the cycle during which this expansion chamber is not in communication with the compartment 104 of variable volume via the main distributor 104.

It should be noted that in this embodiment the compartment of variable volume 101 alternately acts as driving member and as pumping element for replacing the water used.

In FIGS. 1 and 2 there is shown a pump body associated with four chambers and a distribution member such that following a complete revolution of the latter the compartment 101 of variable volume is once connected to the reservoir 117. These arrangements can obviously be modified by connecting the compartment 101 of variable volume to the water reservoir 117 several times during one complete revolution of the distributor 104. Thus it is for example possible to arrange nine chambers and connect the compartment 101 to the water reservoir 117 three times during a working cycle corresponding to one complete revolution of the distribution member 104, so that the water is changed after having passed through three expansion chambers.

The used water can be discharged into a reservoir under high pressure, whereby there is furnished an accumulation of energy usable with an auxiliary motor; in this case the average torque available on the shaft will be reduced and may eventually be zero.

In FIG. 3 there is shown a device for ensuring replacement of water. All the elements fulfilling the same function as previously described are there designated by the same reference numerals as in FIG. 2. Between the compartment 101 of variable volume and the conduit 105 there is interposed a liquid exchange device intended to drive the used water back to the water reservoir 117 and to withdraw cleaner water therefrom.

A liquid exchange device 300, which is shown in greater detail in FIG. 5, is connected to the compartment 101 of variable volume by a conduit 303, to the conduit 105 by a conduit 304 equipped with a check valve 305, and to the water reservoir 117 by conduits 306 and 307. Finally, the compartment 101 is connected to the conduit 105 by the conduit 301 equipped with a check valve 302. The check valves 302 and 305 permit circulation of water only in the direction indicated by the arrow which represents them.

Thus, in the position of the engine shown in FIG. 3 the piston 102 moves toward its upper deadcentre point driving water through the conduits 303 and 306 and toward the water reservoir 117; an amount of water substantially equal to that which is being expelled is drawn from the water reservoir 117 through the conduits 307 and 304 and the valve 305 so as to be driven back to the conduit 105. When on the other hand the piston 102 returns to its bottom deadcentre position, then the communication between the conduit 105 and the compartment 101 is directly reestablished through the conduit 301 and the valve 302.

The liquid exchange device 300, FIG. 5, may comprise a double gear pump: the two halves having the same characteristics and being connected by a common shaft 310; one of the halves is shown in section and comprises a pinion 311 keyed to the shaft 310 and an idler pinion 312. In this manner the amounts of water passing through the two sections are equal, except for leakages. It can be seen in FIG. 3 that the flow in the passages 303 and 304 is equal although used water circulates in the former and cleaner and purified water in the latter. The replacement of water is thus continuous with the aid of a self-governing, not mechanically connected, device.

FIG. 4 shows a liquid exchange device 300 of the same kind but the shaft 310 of which is connected to the shaft 103 of the engine via a connection 400. The distributor 104 is actuated in such manner that the water driven from the compartment 101 by the piston 102 circulates in the conduits 105, 106 and successively in the conduits 109, 111, 113 and 115 while the water which returns toward the compartment 101 in turn circulates in the conduits 110, 112, 114 and 116 before it passes through the conduits 406 and 405. The exchange device 300 which is mechanically driven by a shaft 400 connected to the shafts 103 and 310, continually withdraws used water via the conduit 405 and replaces it by cleaner water in the conduit 105. The flow rate of the exchange device 300 is uniform and may be quite low.

The operation of the engines of FIGS. 1 to 4 is basically identical, each of the expansion chambers being connected to the compartment 101 only during a fraction of time of one cycle and being possibly provided with means for accelerated cooling by a connection with an auxiliary pump intended to withdraw water therefrom so as to atomise it in situ. It is also possible, as has been said in connection with FIG. 2, to form a first mist in each of the chambers by injecting a low percentage of water prior to switching the distribution member 104 from one chamber to the other: in certain cases this result can be very simply obtained by appropriate setting of the distribution member 104. Replacement of the used waters may be effected by the working of the compartment 101, which provides a sequential change-over method, or by having recourse to an auxiliary change-over element which may be free in a series arrangement of a liquid exchange device or driven in a parallel arrangement of the liquid exchange device.

In the case of a parallel arrangement (FIG. 4), a reservoir 408 comprising a freely displaceable separating piston or a deformable membrane 409 is interposed between the conduits 303 and 304. The double gear pump, which constitutes the liquid exchange device 300, is driven by a self-governing motor or by the shaft 103, withdraws the used liquid contained in the part of the reservoir 408 which is connected to the compartment 101 and re-introduces an equal volume of fresh liquid into the other part of the reservoir 408 located at the other side of the piston 409. The latter rises when liquid is driven out from the compartment 101 of variable volume toward the expansion chambers and returns in the other direction through the permanent operation of the double gear pump 300.

Figure 6:
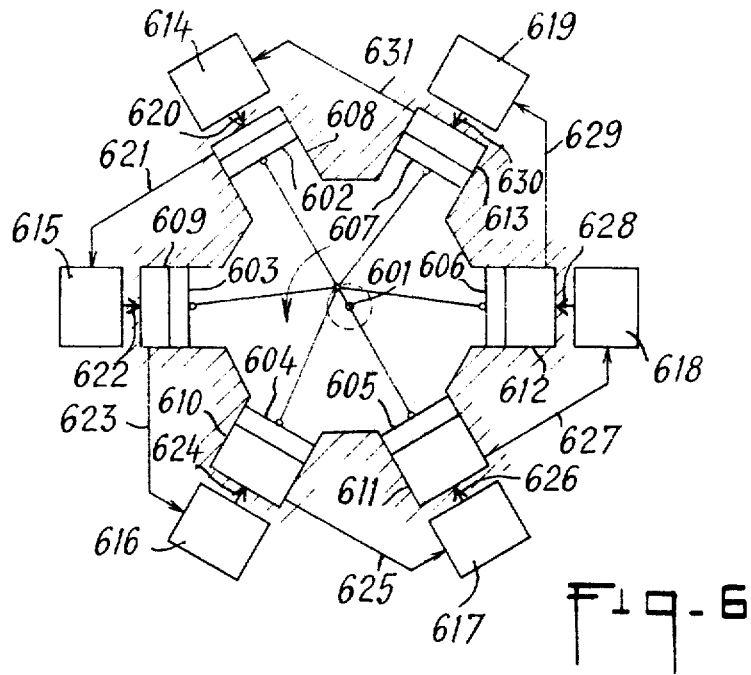
FIG. 6 is a schematic view, in section, of an engine according to a further embodiment of the invention.

In the embodiment shown in FIG. 6, the engine comprises a shaft 601 which drives, by crank and rods, six pistons 602 to 607 the working cycles of which are staggered by 60° from each other; this result can be equally obtained, either by star-assembling as shown in FIG. 6, or by an in-line assembly with offset crank-pins, or by any other expedient.

The pistons move in six compartments or cylinders 608 to 613. Six expansion chambers 614 to 619 are connected to the cylinders by conduits 620 to 631 provided with known valve means (not shown) for opening and shutting the conduits. The cylinders and the conduits are full of water or any other suitable liquid. When the piston in one cylinder moves away from the upper deadcentre point this cylinder draws water from the associated chamber via a conduit 620, 622, 624, 626, 628, 630; when the piston returns to the upper deadcentre point the water is expelled via one of the passages 621, 623, 625, 627, 629, 631; this situation is indicated by the directions of the arrows representing the various passages.

Hot gases are introduced into, or produced in situ by a combustion in, the chambers 614 to 619 when they are almost full of water, the expansion work of these gases transmitted by the liquid mass is derived at the drive shaft 601; at the end of the expansion these gases are rapidly cooled by the water which enters into the chambers in atomised form and at least part of the gases condenses or dissolves.

Escape means may be provided to enable the incondensible part of these gases, if any, to be evacuated. Finally, it is possible, as has already been proposed for other assemblies of thermohydraulic engines, to arrange the operation in a four-stroke cycle.

When the piston 605 for example moves past its lower deadcentre point the water contained in the cylinder 611 is driven through the conduit 627 into the expansion chamber 618 until the piston 605 arrives at its upper deadcentre point, i.e., during a half revolution of the drive shaft 601. During a first fraction of this half revolution, more precisely during one sixth of a revolution, the piston 606 moves toward its lower deadcentre point and consequently a certain amount of water is withdrawn from the chamber 618 via the conduit 628. The result is that during the first sixth of the revolution which follows the position shown in FIG. 6 the expansion chamber 618, almost empty of water, that is at the end of the expansion, receives as much water through the conduit 627 coming from the cylinder 611 as it loses through the conduit 628 toward the cylinder 612. The entering water is atomised to produce a rapid cooling and additionally enables a constant, or almost constant level of water, to be maintained before the beginning of the compression phase. After the piston 606 has reached its lower deadcentre point the chamber 618 will no longer be in communication with the cylinder 611 and the phase of recompression, condensation, dissolution will be able to occur.

This situation will recur in turn in each of the expansion chambers.

The particularity of the engine is thus seen: for each expansion chamber there exists a part of its working cycle during which it is simultaneously connected to two compartments of variable volume one of which injects water thereinto while the other withdraws an equivalent amount therefrom.

Any of the already described methods of regeneration of water is applicable, such as positioning of double gear pump, either self-governing or driven, on one or more of the conduits, or providing a sequential change-over method. With this engine it is particularly easy to adopt this latter method; for example, the expansion chamber 619 may be omitted and the conduits 629 and 630 respectively may open into a reservoir of used water and into a reservoir of regenerated water or into a course of water or into the sea.

It is also possible to discharge the used waters into a reaction pressure reservoir so as to thus create a reservoir of hydraulic energy.

It is likewise possible, by means of an easy arrangement of the distribution member, to multiply the number of expansion chambers in such manner as to contrive for each of them a cycle during which it is only connected to the moving part during a brief interval, the remainder of the cycle being utilised for obtaining a more efficient cooling. This makes it possible, as has already been proposed to do in the case of more simple engines, to exploit the mechanical part at a higher rotary velocity, thus to enhance the power furnished.

It is quite obvious that with this type of engine it is readily possible to obtain a smooth output torque.

All the observations which have been made in connection with FIG. 6 are valid for the description which follows.

Figure 7:
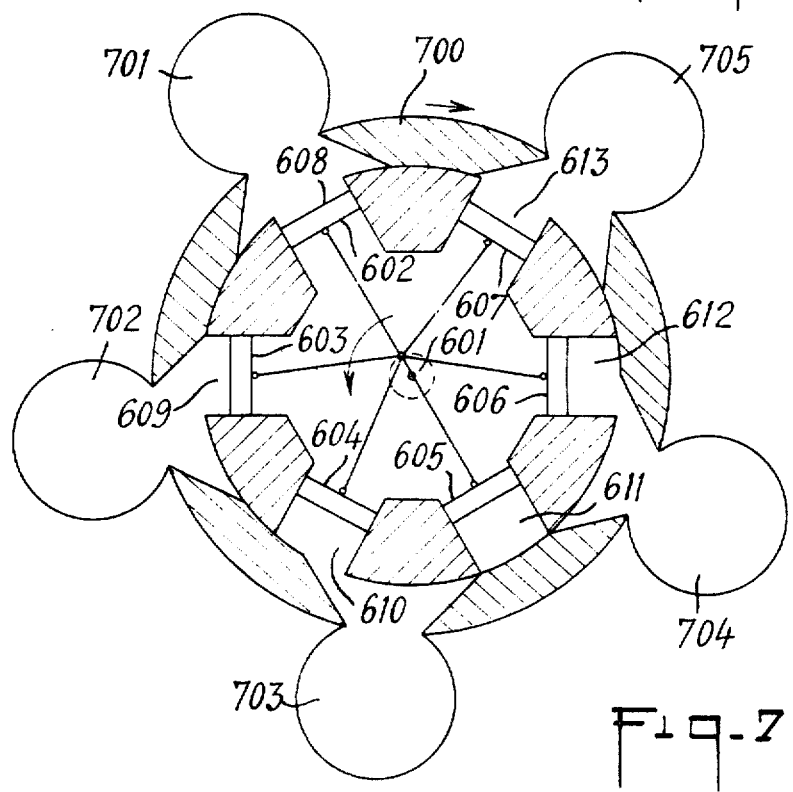
FIG. 7 is a schematic view, in section, of an engine according to yet a further embodiment of the invention.

In FIG. 7 all the movable elements of FIG. 6 are again present, with the same reference numerals, pistons and cylinders, and a revolving distributor 700. This distributor has five openings communicating with five expansion chambers 701 to 705. By means of a set of non-return valves or by any other equivalent means it is possible to achieve that the water introduced into the chambers is forced to pass through atomisers.

When the drive shaft 601 performs a complete revolution the distributor 700 performs one fifth of a revolution. The arrangement of the distributor is such that a cylinder is isolated at the moment when its piston is at its lower deadcentre point. This situation is shown in FIG. 7 for the cylinder 611.

Thus, in FIG. 7 the cylinders 608, 609, 610, 612, 613 respectively communicate with the chambers 701, 702, 703, 704, 705.

During the sixth of a revolution of the drive shaft 601, subsequent to the FIG. 7 situation, the cylinder 611 will also be in communication with the expansion chamber 704, by virtue of the distributor 700 rotating in the direction of the arrow. Thus, during this sixth of a revolution of the shaft 601 the expansion chamber 704 will receive as much water coming from the cylinder 611 as it will deliver to the cylinder 612. The same result as in FIG. 6 can thus be obtained by arranging the circuits.

Each expansion chamber is in turn in communication with each cylinder. By replacing one of them by a liquid reservoir there is obtained, as before, the substitution of water carrying impurities by cleaner water.

Figure 8:
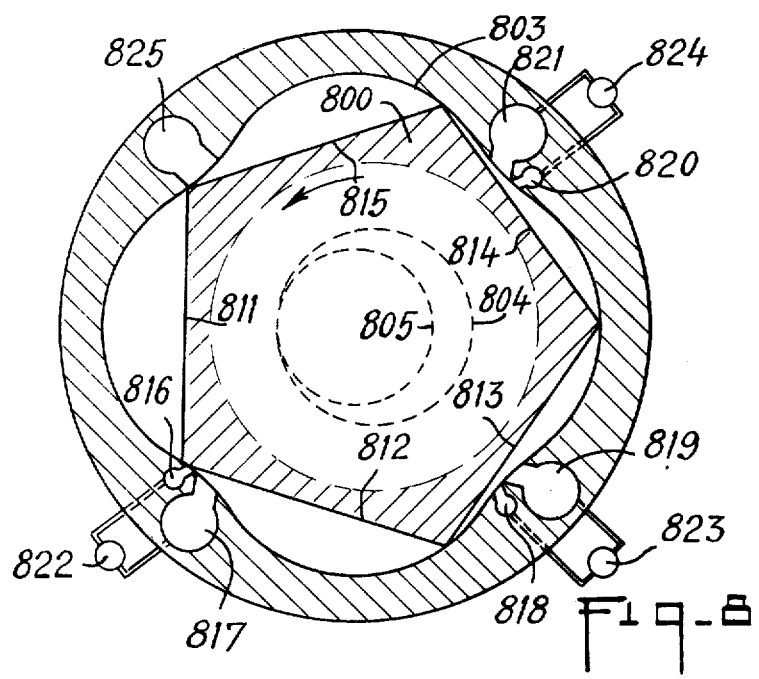
FIGS. 8 and 9 are schematic views, in section, according to yet a further embodiment of the invention.
Figure 9:
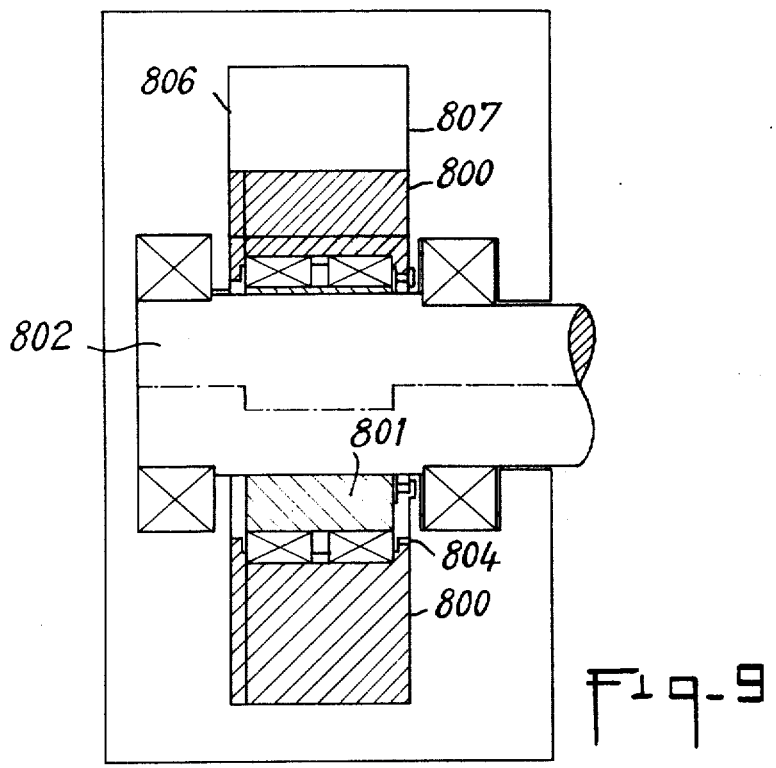

A particularly simple way of obtaining the engine according to FIG. 7 is shown in FIGS. 8 and 9.

FIG. 8 shows in section a hydraulic assembly comprised of a stator having four lobes of trochoidal profile associated with a pentagonal rotor. The rotor 800 is mounted through the intermediary of bearings on a crank pin 801 mounted eccentrically on the shaft 802. The rotor assumes the shape of a regular pentagon the apices of which are equipped with joint-forming edges. The five edges bear simultaneously and constantly on the stator profile 803. The rotor is integral with an internally toothed pinion 804 the original diameter of which equals ten times the eccentricity of the crank pin 801. This pinion is permanently engaged with a pinion secured to the stator the original diameter 805 of which amounts to eight times the eccentricity. In the movement of the shaft 802, the pinion 804 rolls without sliding on the circle 805 and the edges at the five apices of the pentagon run over the same curve which is the stator profile 803.

Of course, the description of a pentagonal rotor is only given by way of explanation and it is readily possible to modify the number of sides. It will be found that the number of lobes of the stator generally differs by one unit, additionally or less, from the number of apices of the rotor, the ratios of the diameters of the pinion 804 and the circle 805 and the eccentricities being modified.

It is apparent from FIG. 8 that five compartments of variable volume are defined between the rotor, the stator and the planar end faces 806 and 807. The compartments carry the same reference numerals 811 to 815 as the sides of the rotor pentagon 800.

Each time the shaft 802 performs one revolution the rotor is found in the same position although having been rotated by a fifth of a revolution, that is the side 811 has come to occupy the position of the side 812 and so on.

In FIG. 8 the compartment 811 is at its lower deadcentre point (maximum volume) and is isolated; all the other compartments 812 to 815 of variable volume communicate via ducts forming conduits referenced 816 to 821 with three expansion chambers 822 to 824 and with a reservoir such as the sea via a passage 825. The compartment 812 of variable volume, the volume of which grows, withdraws water from the expansion chamber 822 via the conduit 817; the compartment 811 of variable volume, which is filled with fresh water through the conduit 825, will force this water first into the conduit 816 which communicates with the expansion chamber 822 through an atomiser. Thus the expansion chamber 822 will be simultaneously connected with the compartment 812 via the conduit 817 and with the compartment 811 via the conduit 816, and as before, a cooling phase without compression is obtained in the expansion chamber 822.

In other respects the operation is the same as that of FIG. 7. It is seen that a structure of a thermohydraulic engine combining mechanical simplicity and efficiency has thus been obtained: only two moving pieces, shaft and rotor, ensure all the functions of circulation, distribution, and replacement of water. Moreover, by simultaneous connection of two compartments of variable volume to a single expansion chamber improved cooling is obtained.

Finally, this kind of engine is capable of coping with very elevated pressures, thus of supplying a large volumic power.

It is, moreover, particularly well suited to an inverse operation wherein the shaft 802 is stationary, the rotor and the stator both revolve at a constant speed, thus providing excellent balancing of the masses in movement and efficient separation of the liquid and gaseous phases in the chambers, by centrifugal action.

I claim:

1. A thermohydraulic engine of the liquid piston type comprising:
   a. a power output shaft member;
   b. at least one compartment of variable volume coupled in driving relationship to the output member;
   c. at least two expansion chambers connected for fluid communication with said compartment;
   d. said compartment to be filled and at least one of the expansion chambers to be partially filled with a liquid during use of the engine, said liquid defining a wall of said chambers; and e. means in each of said expansion chambers for introducing a product capable of producing energy by its expansion, into said selected one of said two expansion chambers in direct contact with said liquid in said chamber when the liquid therein has substantially reached a predetermined level;

f. the number of said compartments of variable volume being less than twice the number of said expansion chambers, and g. conduit means for leading said liquid which has been contacted with said product from said chambers to a liquid receiver, whereby components of said product are carried to said receiver in said liquid.

2. A thermohydraulic engine as claimed in claim 1, further comprising a distribution arrangement connected to said compartment and to a plurality of said expansion chambers, said distribution arrangement being adapted to place each expansion chamber successively in fluid communication with said compartment.

3. A thermohydraulic engine as claimed in claim 1, having at least two of said compartments coupled to said shaft member with an angular offset therebetween, said two compartments being disposed so that they are in fluid communication with the same expansion chamber at one instant of their working.

4. A thermohydraulic engine as claimed in claim 1, having a plurality of said expansion chambers and a plurality of said compartments and further comprising means for isolating said expansion chambers one after the other from said compartments.

5. A thermohydraulic engine as claimed in claim 1, having at least two of said compartments and wherein each expansion chamber is connected by conduits to said two compartments.

6. A thermohydraulic engine as claimed in claim 1, having a plurality of said expansion chambers and of said compartments, and further comprising means for placing each of said expansion chambers successively in communication with each of said compartments.

7. A thermohydraulic engine as claimed in claim 1, having a plurality of said expansion chambers, and further comprising a reservoir of liquid disposed in place of one of said expansion chambers.

8. A thermohydraulic engine as claimed in claim 7, further comprising energy extraction means disposed upstream of said reservoir for enabling the used liquid to give up its hydraulic energy before reaching said reservoir.

9. A thermohydraulic engine as claimed in claim 1, further comprising liquid exchange means for withdrawing a certain volume of used liquid from at least one of said conduits and replacing it by an equal volume of fresh liquid.

10. A thermohydraulic engine as claimed in claim 4, further comprising liquid exchange means for withdrawing a certain volume of used liquid from said conduit means and replacing it by an equal volume of fresh liquid, said liquid exchange means being adaptable to introduce the fresh liquid into the isolated expansion chamber in atomised form.

11. A thermohydraulic engine as claimed in claim 1, having a plurality of said compartments defined by two multilobed cylindrical bodies movable one with respect to the other, one of said two bodies being of trochoidal shape, wherein the number of lobes of one of said two cylindrical bodies differs by one from the number of lobes on the other cylindrical body.

12. A thermohydraulic engine according to claim 1, further comprising a chassis on which said expansion chambers are assembled, said chassis being revolvable about said shaft member.

13. Apparatus in accordance with claim 1 and including input conduit means for introducing into said expansion chambers, during a portion of the operative cycle, a quantity of liquid commensurate with the quantity which was evacuated during other portions of the cycle, said input conduit means including an atomizer whereby at least a portion of said quantity of liquid is introduced into said chamber in atomized form.

* * * * *